United States Patent
Ma et al.

(10) Patent No.: US 12,468,531 B2
(45) Date of Patent: Nov. 11, 2025

(54) DATA PROCESSING METHOD AND APPARATUS, AND RELATED PRODUCT

(71) Applicant: Anhui Cambricon Information Technology Co., Ltd., Hefei (CN)

(72) Inventors: Xuyan Ma, Hefei (CN); Jianhua Wu, Hefei (CN); Shaoli Liu, Hefei (CN); Xiangxuan Ge, Hefei (CN); Hanbo Liu, Hefei (CN); Lei Zhang, Hefei (CN)

(73) Assignee: ANHUI CAMBRICON INFORMATION TECHNOLOGY CO., LTD., Hefei (CN)

(*) Notice: Subject to any disclaimer, the term of this patent is extended or adjusted under 35 U.S.C. 154(b) by 0 days.

(21) Appl. No.: 17/619,774

(22) PCT Filed: Apr. 28, 2021

(86) PCT No.: PCT/CN2021/090648
§ 371 (c)(1),
(2) Date: Oct. 3, 2022

(87) PCT Pub. No.: WO2021/223642
PCT Pub. Date: Nov. 11, 2021

(65) Prior Publication Data
US 2024/0126548 A1    Apr. 18, 2024

(30) Foreign Application Priority Data
May 8, 2020    (CN) .......................... 202010382523.2

(51) Int. Cl.
*G06F 9/30*    (2018.01)
*G06N 20/00*    (2019.01)

(52) U.S. Cl.
CPC ...... *G06F 9/30043* (2013.01); *G06F 9/30036* (2013.01); *G06F 9/30047* (2013.01); *G06N 20/00* (2019.01)

(58) Field of Classification Search
CPC ............. G06F 9/30043; G06F 9/30036; G06F 9/30047; G06N 20/00
See application file for complete search history.

(56) References Cited

U.S. PATENT DOCUMENTS

| 6,105,075 A | 8/2000 | Ghaffari |
| 7,216,218 B2* | 5/2007 | Wilson ................. G06F 9/3455 712/27 |

(Continued)

FOREIGN PATENT DOCUMENTS

| CN | 103810125 A | 5/2014 |
| CN | 107301453 A | 10/2017 |
| CN | 108292232 A | 7/2018 |

OTHER PUBLICATIONS

PCT/CN2021/090648—International Search Report and Written Opinion, mailed Jul. 30, 2021, 10 pages.

*Primary Examiner* — Corey S Faherty
(74) *Attorney, Agent, or Firm* — Getech Law LLC; Jun Ye

(57) ABSTRACT

The present disclosure relates to a data processing method, a data processing apparatus, and related products. The data processing apparatus includes an address determining unit and a data storage unit. The address determining unit is configured to determine a source data address and a plurality of discrete destination data addresses of data corresponding to a processing instruction when the decoded processing instruction is a discrete store instruction, where the source data address may include continuous data addresses. The data storage unit is configured to obtain a plurality of pieces of discrete data by sequentially storing data read from the (Continued)

```
┌─────────────────────────────────────────────────┐  S11
│ Determine a source data address and a plurality │
│ of discrete destination data addresses of data  │
│ corresponding to a decoded processing           │
│ instruction when the decoded processing         │
│ instruction is a discrete store instruction,    │
│ where the source data address may include      │
│ continuous data addresses                       │
└─────────────────────────────────────────────────┘
                      │
                      ▼                              S12
┌─────────────────────────────────────────────────┐
│ Store the data read from the source data        │
│ address sequentially to the plurality of        │
│ destination data addresses to obtain a          │
│ plurality of pieces of discrete data            │
└─────────────────────────────────────────────────┘
``` source data address to the plurality of destination data addresses.

9 Claims, 2 Drawing Sheets

(56) References Cited

U.S. PATENT DOCUMENTS

| | | | |
|---|---|---|---|
| 7,707,393 B2 * | 4/2010 | Wilson | G06F 9/3455 712/27 |
| 9,298,456 B2 * | 3/2016 | Gonion | G06F 9/30036 |
| 10,049,061 B2 * | 8/2018 | Fleischer | G06F 15/785 |
| 2012/0254591 A1 | 10/2012 | Hughes et al. | |
| 2017/0177360 A1 * | 6/2017 | Gokhale | G06F 9/3555 |

* cited by examiner

DATA PROCESSING METHOD AND APPARATUS, AND RELATED PRODUCT

CROSS REFERENCE OF RELATED APPLICATION

This is a 371 of International Application No. PCT/CN2021/090648, filed Apr. 28, 2021 which claims priority to Chinese Patent Application No. 202010382523.2, filed May 8, 2020, and entitled "DATA PROCESSING METHOD AND APPARATUS, AND RELATED PRODUCT", the entire disclosures of which are incorporated herein by reference.

TECHNICAL FIELD

The disclosure relates to the technical field of computers, and particularly to a data processing method, a data processing device, and related products.

BACKGROUND

With the development of artificial intelligence technology, great progress in image recognition and other fields has been made. During image recognition, a large number of discrete data points may need to be processed (for example, performing a difference computation on the discrete data points). However, a process of processing discrete data points by means of related technologies is relatively complicated, resulting in relatively large data overhead.

SUMMARY

In view of above, it is necessary to provide a data processing method, a data processing device, and related products, to solve the above technical problems.

A first aspect of the present disclosure provides a data processing method. The data processing method may include: determining a source data address and a plurality of discrete destination data addresses of data corresponding to a processing instruction when the decoded processing instruction is a discrete store instruction, where the source data address may include continuous data addresses; and storing data read from the source data address to the plurality of destination data addresses sequentially to obtain a plurality of pieces of discrete data.

A second aspect of the present disclosure provides a data processing apparatus. The data processing apparatus may include an address determining unit and a data storage unit. The address determining unit may be configured to determine a source data address and a plurality of discrete destination data addresses of data corresponding to a processing instruction when the decoded processing instruction is a discrete store instruction, where the source data address may include continuous data addresses. The data storage unit may be configured to obtain a plurality of pieces of discrete data by sequentially storing data read from the source data address to the plurality of destination data addresses.

A third aspect of the present disclosure provides an artificial intelligence chip. The artificial intelligence chip may include the above data processing apparatus.

A fourth aspect of the present disclosure provides an electronic apparatus. The electronic apparatus may include the above artificial intelligence chip.

A fifth aspect of the present disclosure provides a board card. The board card may include a storage component, an interface apparatus, a control component, and the above artificial intelligence chip. The artificial intelligence chip is respectively connected to the storage component, the control component, and the interface apparatus. The storage component may be configured to store data. The interface apparatus may be configured to implement data transmission between the artificial intelligence chip and an external device. The control component may be configured to monitor a state of the artificial intelligence chip.

According to embodiments of the present disclosure, a plurality of pieces of discrete data can be obtained by storing vector data of continuous data addresses into a plurality of discrete data addresses according to a discrete store instruction, so that a vector may be restored to discrete data points after a vector computation processing, which may simplify a processing process, thereby reducing data overhead.

By deriving technical features of claims, advantageous effects corresponding to the technical problems in the BACKGROUND may be achieved. Exemplary embodiments may be described in detail with reference to accompanying drawings described below, and other features and aspects of the disclosure may become clear.

BRIEF DESCRIPTION OF THE DRAWINGS

Accompanying drawings contained in the specification and constituting a part of the specification together with the specification illustrate exemplary embodiments, features, and aspects of the present disclosure, and are used to explain the principle of the present disclosure.

DETAILED DESCRIPTION

Figure 1:
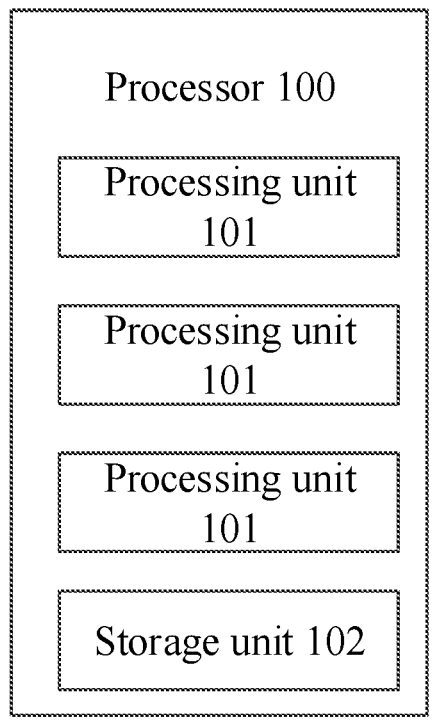
FIG. 1 is a schematic diagram of a processor of a data processing method, according to an embodiment of the present disclosure.

Hereinafter, technical solutions in embodiments of the present disclosure may be described in a clear and comprehensive manner with reference to accompanying drawings of embodiments of the present disclosure. It is evident that the embodiments described herein are some rather than all embodiments of the present disclosure. Those of ordinary skill in the art may be able to derive other embodiments based on the embodiments of the present disclosure without making creative efforts, and all these derived embodiments shall all fall within the protection scope of the present disclosure.

It should be understood that, the terms "include/comprise" and "contain" as well as variations thereof used in the specification and claims of the present disclosure mean existence of described features, wholes, steps, operations, elements, and/or components, but do not exclude existence or addition of one or more other features, wholes, steps, operations, elements, components, and/or sets thereof.

It should also be understood that, terms used in the specification of the present disclosure are merely for describing a specific embodiment, and not intended to limit the present disclosure. As used in the specification and claims of the present disclosure, unless the context clearly indicates otherwise, the terms "a/an", "a piece of", and "the/this" in a singular form, and the like may include plural forms. It should be further understood that, the term "and/ or" used in the specification and claims of the present disclosure refers to any combinations of one or more of items listed in association and all possible combinations, and may include these combinations.

As used in the specification and claims, the term "if" may be interpreted as "when", "once", "in response to a determination", or "in response to a case where something is detected" depending on the context. Similarly, depending on the context, the terms "if it is determined that" or "if [the condition or event described] is detected" may be interpreted as "once it is determined that", or "in response to a determination", or "once [the condition or event described] is detected", or "in response to a case where [the condition or event described] is detected".

A data processing method of embodiments of the present disclosure may be applied to a processor. The processor may be a general-purpose processor, such as a central processing unit (CPU), or an intelligence processing unit (IPU) configured to perform artificial intelligence computations. The artificial intelligence computation may include a machine learning computation, a brain-like computation, and the like. The machine learning computation may include a neural network computation, a k-means computation, a support vector machine computation, and the like. The IPU may include, for example, one or a combination of a graphics processing unit (GPU), a neural-network processing unit (NPU), a digital signal process (DSP), and a field-programmable gate array (FPGA) chip. The present disclosure does not limit the type of the processor.

In a possible embodiment, the processor of the present disclosure may include a plurality of processing units, and each of the processing units may independently run various assigned tasks, such as convolution computation tasks, pooling tasks, or full connection tasks. The present disclosure does not limit the processing unit and tasks run by the processing unit.

FIG. 1 is a schematic diagram of a processor of a data processing method according to an embodiment of the present disclosure. As illustrated in FIG. 1, a processor 100 may include a plurality of processing units 101 and a storage unit 102. The plurality of processing units 101 may be configured to execute instruction sequences. The storage unit 102 may be configured to store data. The storage unit 102 may include a random-access memory (RAM) and a register file. The plurality of processing units 101 of the processor 100 may not only share part of a storage space (for example, share part of a RAM storage space and a register file), but also have their own storage space.

Figure 2:
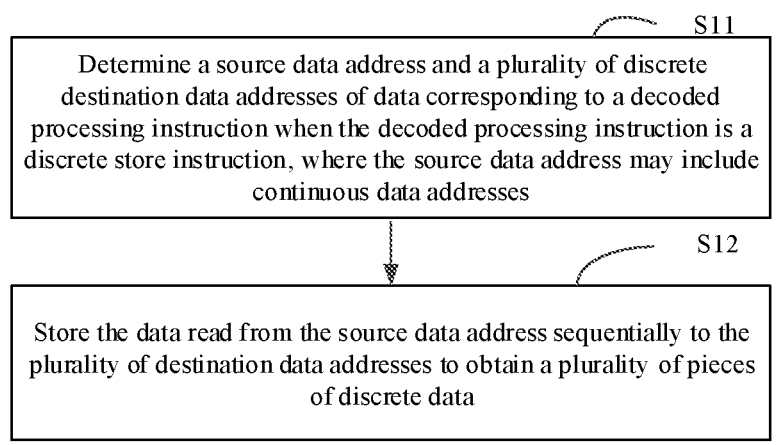
FIG. 2 is a flowchart of a data processing method, according to an embodiment of the disclosure.

FIG. 2 is a flowchart of a data processing method according to an embodiment of the present disclosure. As illustrated in FIG. 2, the method may include:

in step S11, determining a source data address and a plurality of discrete destination data addresses of data corresponding to a decoded processing instruction when the decoded processing instruction is a discrete store instruction, where the source data address may include continuous data addresses; and in step S12, storing the data read from the source data address sequentially to the plurality of destination data addresses to obtain a plurality of pieces of discrete data.

According to embodiments of the present disclosure, a plurality of pieces of discrete data may be obtained by storing vector data of continuous data addresses into a plurality of discrete data addresses according to a discrete store instruction, so that a vector may be restored to discrete data points after a vector computation operation, which may simplify a processing process, thereby reducing data overhead.

In a possible implementation, the method may further include: decoding the received processing instruction to obtain a decoded processing instruction, where the decoded processing instruction may contain an operation code, and the operation code is configured to indicate a performing of discrete storage processing.

For example, when receiving the processing instruction, the processor may decode the received processing instruction to obtain the decoded processing instruction. The decoded processing instruction may contain an operation code and an operation field. The operation code is configured to indicate a processing type of the processing instruction, and the operation field is configured to indicate data to be processed and a data parameter. If the operation code of the decoded processing instruction indicates the performing of discrete storage processing, the instruction is a discrete store instruction (such as scatter store).

In a possible implementation, if the decoded processing instruction is the discrete store instruction, in step S11, the source data address and the plurality of discrete destination data addresses of the data corresponding to the decoded processing instruction may be determined. The data corresponding to the decoded processing instruction is vector data indicated by the operation field of the processing instruction. The source data address represents current data storage addresses of a plurality of pieces of data of the vector data in a data storage space, and the source data address is continuous data addresses. The destination data address indicates data addresses in a data storage space to which a plurality of pieces of data are to be stored, and the destination data address is a plurality of discrete data addresses. The data storage space where the source data address is located may be the same as or different from the data storage space where the plurality of destination data addresses are located, which is not limited in the present disclosure.

In a possible implementation, after the source data address and the destination data addresses are determined, in step S12, the processor may read the plurality of pieces of data of the vector data from the source data address according to a data length and sequentially store the read plurality of pieces of data into the plurality of destination data addresses to obtain a plurality of pieces of discrete data, thereby completing the discrete storage process.

In a possible implementation, in an application scenario (such as image recognition) where a large number of discrete data point pairs need to be computed, discrete data may be transmitted into continuous address spaces to be aggregated into vector data for further vector computation. When the vector computation is completed, vector data may be stored into a plurality of discrete data points according to the discrete store instruction, thereby achieving a whole processing process.

In this way, discrete storage of the vector data may be achieved, which may simplify a processing process, thereby reducing data overhead.

In a possible implementation, step S11 may include determining source data addresses of the plurality of pieces of data respectively according to source data base addresses and data sizes of the plurality of pieces of data in an operation field of the processing instruction.

For example, the discrete store instruction may have an operation field for indicating a data parameter of data to be stored. The operation field may include a source data base address, a destination data base address, a single data point size, a single point data number, an offset vector base address of the single data point, an offset size, and the like.

The source data base address may represent current base addresses of a plurality of data points of vector data in a data storage space. The destination data base addresses may represent base addresses in a data storage space to which a plurality of data points to be stored. The single data point size may represent a data size (such as 4 bits or 8 bits) of each data point of the vector data. The single data point number may represent the count N of data points of the vector data (N is an integer greater than 1). The offset vector base address of the single point data may represent a base address of each piece of point data of the vector data relative to the source data base address, and the offset size may represent the width of an offset address corresponding to each piece of point data of the vector data. For example, the offset size may be greater than or equal to the size of single data point. The specific count and types of parameters in the operation field of the discrete store instruction are not limited in the present disclosure.

In a possible implementation, the operation field of the discrete store instruction may contain a source data base address and the single point data size. Since the source data addresses are continuous data addresses, the source data addresses of the data may be determined directly according to data sizes and serial numbers of the data sequentially. The source data address of the n-th data point may be expressed as:

$$\text{Single Point Src Addr}[n] = \text{Source Data Base Address} + n * \text{Single Point Data Size} \quad (1).$$

In formula (1), Single Point Src Addr[n] represents the source data address of the n-th data point. When the source data base address is, for example, Addr[0, 3], and the size of a single data point is 4 bits, and n equals to 3, the source data address of the third data point may be determined to be Addr1[12, 15].

In this way, the source data address of each piece of data may be determined, so that each piece of data of the vector may be read from the source data address and discretely stored to the destination data address of each piece of data.

In a possible implementation, step S11 may include respectively determining the plurality of destination data addresses according to destination data base addresses and data offset addresses of a plurality of pieces of data in an operation field of the processing instruction.

For example, the operation field of the discrete store instruction may include a destination data base address, an offset vector base address of a single data point, an offset size of a single data point, and the like. A data offset address of the data point may be determined according to a data offset base address and an offset size of the single data point in the operation domain. For example, for the n-th data point ($1 \leq n \leq 1V$), a data offset base address of the data point is 24, and an offset size of the data point is 4, then a data offset address of the data point, Offset Address[n], is [24, 27]. Therefore, a destination data address of the n-th data point may be determined according to a destination data base address and the data offset address.

$$\text{Single Point Dest Addr}[n] = \text{Destination Data Base Address} + \text{Offset Address}[n] \quad (2).$$

In formula (2), Single Point Dest Addr[n] represents the destination data address of the n-th data point. When the destination data base address is, for example, Addr2[15], and the data offset address of the n-th data point is [24, 27], the destination data address of the n-th data point may be determined to be Addr2[39, 42].

In this way, for each piece of data, a destination data address may be determined, so that the data read from the source data address may be stored into the destination data address.

In a possible implementation, step S12 may include: reading each piece of data from source data addresses of a plurality of pieces of data respectively; and obtaining the plurality of pieces of data by storing the plurality of pieces of data into the destination data addresses sequentially.

For example, after the source data address and the destination data address of each piece of data in the operation field are determined, the data may be read from the source data address of the data and stored into the destination data address sequentially. For example, when n=3, data is read from the source data address Addr1[9,12] of the third data point and then stored into the destination data address Addr2[39,42], thereby completing discrete storage of the data point. In this way, the data points are sequentially discretely stored to obtain N discrete data points stored in N destination data addresses, thereby completing the discrete storage of the vector data.

In this way, discrete storage may be realized to obtain a large number of processed discrete data points.

According to the data processing method of the embodiments of the present disclosure, each piece of data of vector data may be discretely stored into discrete address space according to a discrete store instruction to obtain a plurality of discrete pieces of data. Therefore, when vector computation of a large number of discrete data point pairs is completed in application scenarios (such as image recognition), a vector obtained after the vector computation is discretely stored as discrete data points to obtain discrete processing results, which may simplify a processing process, thereby reducing data overhead.

It should be noted that, for the sake of simplicity, the foregoing method embodiments are described as a series of action combinations, however, those skilled in the art should know that the present disclosure is not limited by the sequence of described actions. That is because that, according to the present disclosure, some steps may be performed in other orders or simultaneously. Besides, those skilled in the art should also know that the embodiments described in the specification are optional embodiments, and the actions and units involved are not necessarily essential to the present disclosure.

It should be further noted that, although steps in the flowchart are displayed sequentially according to the arrows, these steps are not necessarily executed in the sequence indicated by the arrows. Unless explicitly stated herein, the execution of these steps is not strictly limited to the order, and these steps may be executed in other orders. Moreover, at least a part of the steps in the flowchart may include a plurality of sub-steps or stages. These sub-steps or stages are not necessarily executed simultaneously, but may be executed at different times. These sub-steps or stages are not necessarily executed sequentially, but may be executed in turns or alternately with other steps or at least a part of the sub-steps or stages of other steps.

Figure 3:
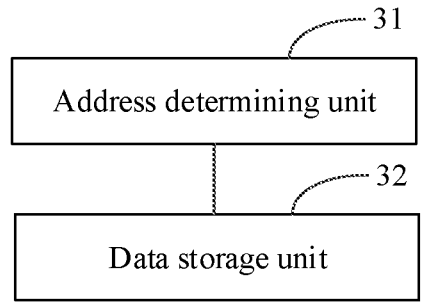
FIG. 3 is a block diagram of a data processing apparatus, according to an embodiment of the present disclosure.

FIG. 3 is a block diagram of a data processing apparatus according to an embodiment of the present disclosure. As illustrated in FIG. 3, the apparatus may include an address determining unit 31 and a data storage unit 32. The address determining unit 31 may be configured to determine a source data address and a plurality of discrete destination data addresses of data corresponding to a processing instruction when the decoded processing instruction is a discrete store instruction, where the source data address may include continuous data addresses. The data storage unit 32 may be configured to obtain a plurality of pieces of discrete data by sequentially storing data read from the source data address to the plurality of destination data addresses.

In a possible implementation, the address determining unit 31 may include a source address determining subunit. The source address determining subunit may be configured to determine source data addresses of a plurality of pieces of data according to source data base addresses and data sizes of the plurality of pieces of data in an operation field of the processing instruction.

In a possible implementation, the address determining unit 31 may include a destination address determining subunit. The destination address determining subunit may be configured to determine the plurality of destination data addresses respectively according to destination data base addresses and data offset addresses of a plurality of pieces of data in an operation field of the processing instruction.

In a possible implementation, the data storage unit 32 may include a reading subunit and a storage subunit. The reading subunit may be configured to read data from source data addresses of a plurality of pieces of data respectively. The storage subunit may be configured to obtain the plurality of pieces of data by storing the plurality of pieces of data into the destination data addresses sequentially.

In a possible implementation, the device may further include a decoding unit. The decoding unit may be configured to obtain the decoded processing instruction by decoding a received processing instruction, where the decoded processing instruction may contain an operation code, and the operation code is configured to indicate the performing of discrete storage processing.

It should be understood that, the foregoing apparatus embodiments are merely illustrative, and the apparatus of the present disclosure may be implemented in other manners. For example, the division of the unit/module in the foregoing embodiments is only a logical function division, and there may be other manners of division during actual implementations. For instance, a plurality of units, modules, or components may be combined or may be integrated into another system, or some features may be ignored, omitted, or not performed.

In addition, unless specified otherwise, functional units/modules in various embodiments of the present disclosure may be integrated into one unit/module, or each unit/module may be physically alone, or two or more units/modules may be integrated into one unit/module. The above-mentioned integrated unit/module may be implemented in the form of hardware or a software program unit.

If the integrated unit/module is implemented in the form of hardware, the hardware may be a digital circuit, an analog circuit, and the like. The physical realization of a hardware structure may include, but is not limited to, a transistor, a memristor, and the like. Unless specified otherwise, an artificial intelligence processor may be any appropriate hardware processor, such as CPU (central processing unit), GPU (graphics processing unit), FPGA (field-programmable gate array), DSP (digital signal processor), and ASIC (application specific integrated circuit). Unless specified otherwise, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), and a hybrid memory cube.

The integrated unit/module may be stored in a computer readable memory when it is implemented in the form of a software program unit and is sold or used as a separate product. Based on such understanding, the technical solutions of the present disclosure essentially, or the part of the technical solutions that contributes to the related art, or all or part of the technical solutions, may be embodied in the form of a software product. The software product is stored in a memory and may include instructions for making a computer device (which may be a personal computer, a server, or a network device, and the like) to perform all or part of the operations of the method described in the various embodiments of the present disclosure. The memory may include various medium capable of storing program codes, such as a universal serial bus (USB), a read-only memory (ROM), a random access memory (RAM), a removable hard disk, Disk, and compact disc (CD), and the like.

In a possible implementation, an artificial intelligence chip is further disclosed. The artificial intelligence chip may include the above data processing apparatus.

In a possible implementation, an electronic device is further disclosed. The electronic device may include the above artificial intelligence chip.

In a possible implementation, a board card is further disclosed. The board card may include a storage component, an interface apparatus, a control component, and the above artificial intelligence chip. The artificial intelligence chip is respectively connected to the storage component, the control component, and the interface apparatus. The storage component may be configured to store data. The interface apparatus may be configured to implement data transmission between the artificial intelligence chip and an external device. The control component may be configured to monitor a state of the artificial intelligence chip.

Figure 4:
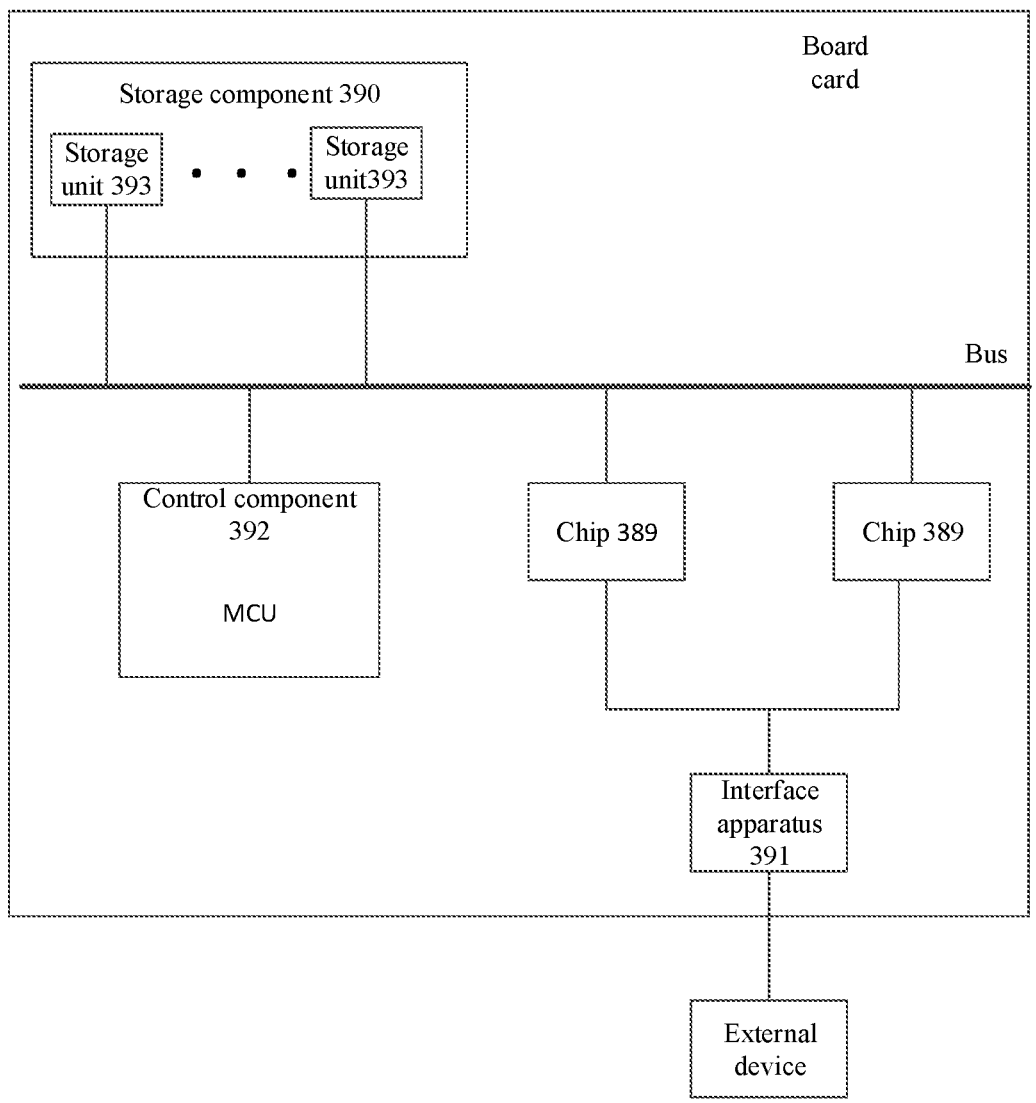
FIG. 4 is a structural block diagram of a board card, according to an embodiment of the present disclosure.

FIG. 4 is a structural block diagram of a board card according to an embodiment of the present disclosure. Referring to FIG. 4, the board card may include other supporting components in addition to the chip 389 described above. The supporting components may include, but is not limited to, a storage component 390, an interface apparatus 391, and a control device 392.

The storage component 390 is connected to the artificial intelligence chip via a bus, and the storage component may be configured to store data. The storage component may include a plurality of sets of storage units 393. Each set of storage units are connected to the artificial intelligence chip via the bus. It may be understood that, each set of storage units may be a double data rate synchronous dynamic random-access memory (DDR SDRAM).

DDR may double a speed of an SDRAM without increasing a clock rate. DDR allows data to be read on rising and falling edges of a clock pulse. A speed of DDR is twice that of a standard SDRAM. In an embodiment, the storage apparatus may include four sets of storage units. Each set of storage units may include a plurality of DDR4 particles (chips). In an embodiment, the artificial intelligence chip may include four 72-bit DDR4 controllers. For a 72-bit DDR4 controller, 64 bits are used for data transmission and 8 bits are used for ECC parity. It may be understood that, if a DDR4-3200 particle is used in each set of storage units, a theoretical bandwidth of data transmission may reach 25600 MB/s.

In an embodiment, each set of storage units may include a plurality of DDR SDRAMs arranged in parallel. DDR allows data to be transmitted twice in a clock cycle. A controller configured to control the DDR is arranged in the chip, and the controller is configured to control data transmission and data storage of each storage unit.

The interface apparatus is electrically connected with the artificial intelligence chip. The interface apparatus may be configured to implement data transmission between the artificial intelligence chip and an external device (such as a server or a computer). In an embodiment, the interface apparatus may be a standard PCIe (peripheral component interface express) interface. As an example, data to be processed is transmitted from a server to the chip through a standard PCIe interface to realize data transfer. If a PCIe 3.0×16 interface is used for transmission, a theoretical bandwidth may reach 16000 MB/s. In another embodiment, the interface apparatus may also be other interfaces, and the present disclosure does not limit specific manifestations of the above mentioned other interfaces, as long as an interface unit may realize a transfer function. In addition, a calculation result of the artificial intelligence chip is still transmitted back to an external device (such as a server) through the interface apparatus.

The control component is electrically connected with the artificial intelligence chip. The control component may be configured to monitor a state of the artificial intelligence chip. As an example, the artificial intelligence chip is electrically connected with the control component through an SPI (serial peripheral interface). The control component may include a micro controller unit (MCU). For example, the artificial intelligence chip may include a plurality of processing chips, a plurality of processing cores, or a plurality of processing circuits, and the artificial intelligence chip may drive a plurality of loads. Therefore, the artificial intelligence chip may be in different working states such as a multi-load working state and a light-load working state. The control device may realize regulation and control of working states of a plurality of processing chips, a plurality of processing, and/or a plurality of processing circuits in the artificial intelligence chip.

In a possible implementation, an electronic device is disclosed. The electronic device may include the above artificial intelligence chip. The electronic device may include a data processing apparatus, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or a medical equipment. The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In the foregoing embodiments, the description of each embodiment has its own emphasis. For the parts not described in detail in an embodiment, reference may be made to related descriptions in other embodiments. The technical features of the foregoing embodiments may be combined arbitrarily. For the sake of concise description, not all possible combinations of the various technical features in the foregoing embodiments are described. However, as long as there is no contradiction in a combination of these technical features, this combination should be considered as falling within the scope of the specification.

The foregoing can be better understood according to the following clauses.

Article A1. A data processing method, comprising: determining a source data address and a plurality of discrete destination data addresses of data corresponding to a decoded processing instruction when the decoded processing instruction is a discrete store instruction, wherein the source data address comprises continuous data addresses; and obtaining a plurality of pieces of discrete data by sequentially storing data read from the source data address to the plurality of destination data addresses.

Article A2. The method of A1, wherein determining the source data address and the plurality of discrete destination data addresses of the data corresponding to the decoded processing instruction when the decoded processing instruction is the discrete store instruction includes:

determining source data addresses of a plurality of pieces of data according to source data base addresses and data sizes of the plurality of pieces of data in an operation field of the processing instruction.

Article A3. The method of A1 or A2, wherein determining the source data address and the plurality of discrete destination data addresses of the data corresponding to the decoded processing instruction when the decoded processing instruction is the discrete store instruction includes:

determining the plurality of destination data addresses respectively according to destination data base addresses and data offset addresses of a plurality of pieces of data in an operation field of the processing instruction.

Article A4. The method of any one of A1 to A3, wherein obtaining the plurality of pieces of discrete data by sequentially storing the data read from the source data address to the plurality of destination data addresses includes:

reading the data from the source data addresses of a plurality of pieces of data respectively; and obtaining the plurality of pieces of discrete data by storing the plurality of pieces of data into the destination data addresses sequentially.

Article A5. The method of any one of A1 to A4, further comprising:

obtaining the decoded processing instruction by decoding a received processing instruction, wherein the decoded processing instruction contains an operation code, and the operation code is configured to indicate a performing of a discrete storage processing.

Article A6. A data processing apparatus, comprising:

an address determining unit configured to determine a source data address and a plurality of discrete destination data addresses of data corresponding to a processing instruction when a decoded processing instruction is a discrete store instruction, wherein the source data address comprises continuous data addresses; and a data storage unit configured to obtain a plurality of pieces of discrete data by sequentially storing data read from the source data address to the plurality of destination data addresses.

Article A7. The apparatus of A6, wherein the address determining unit includes:

a source address determining subunit configured to determine source data addresses of a plurality of pieces of data according to source data base addresses and data sizes of the plurality of pieces of data in an operation field of the processing instruction.

Article A8. The apparatus of A6 or A7, wherein the address determining unit includes:

a destination address determining subunit configured to determine the plurality of destination data addresses respectively according to destination data base addresses and data offset addresses of the plurality of pieces of data in the operation field of the processing instruction.

Article A9. The apparatus of any one of A6 to A8, wherein the data storage unit includes:
a reading subunit configured to read the data from the source data addresses of the plurality of pieces of data respectively; and
a storage subunit configured to obtain the plurality of pieces of data by storing the plurality of pieces of data into the destination data addresses sequentially.

Article A10. The apparatus of any one of A6 to A9, further comprising:
a decoding unit configured to obtain the decoded processing instruction by decoding a received processing instruction, wherein the decoded processing instruction contains an operation code, and the operation code is configured to indicate a performing of a discrete storage processing.

Article A11. An artificial intelligence chip comprising the data processing apparatus of any one of A6 to A10.

Article A12. An electronic device comprising the artificial intelligence chip of A11.

Article A13. A board card comprising a storage component, an interface apparatus, a control component, and the artificial intelligence chip of A11. The artificial intelligence chip is connected with the storage component, the control component, and the interface apparatus respectively, wherein
the storage component is configured to store data;
the interface apparatus is configured to implement data transmission between the artificial intelligence chip and an external device; and
the control component is configured to monitor a state of the artificial intelligence chip.

The implementations of the disclosure have been described in detail above. The principles and implementations of the disclosure are described in connection with illustrative examples, it is to be understood that the descriptions of the foregoing implementations are merely used to help understand the method and core ideas of the disclosure. Any changes or modifications based on the implementations and the application scope of the disclosure made by those skilled in the art, without departing from the spirits of the disclosure, shall all be encompassed within the protection scope of the disclosure. Therefore, the disclosure is not to be limited to the disclosed implementations.

What is claimed is:

1. A data processing method, comprising:
determining a source data address and a plurality of discrete destination data addresses of data corresponding to a decoded processing instruction when the decoded processing instruction is a discrete store instruction, wherein the source data address comprises continuous data addresses; and
obtaining a plurality of pieces of discrete data by sequentially storing data read from the source data address to the plurality of destination data addresses,
wherein determining the source data address and the plurality of discrete destination data addresses of the data corresponding to the decoded processing instruction when the decoded processing instruction is the discrete store instruction includes:
determining source data addresses of a plurality of pieces of data according to source data base addresses and data sizes of the plurality of pieces of data in an operation field of the processing instruction, wherein each of the data sizes indicates a count of bits at each of the source data addresses, and
determining the plurality of destination data addresses respectively according to destination data base addresses and data offset addresses of a plurality of pieces of data in an operation field of the processing instruction.

2. The method of claim 1, wherein obtaining the plurality of pieces of discrete data by sequentially storing the data read from the source data address to the plurality of destination data addresses includes:
reading data from source data addresses of a plurality of pieces of data respectively; and
obtaining the plurality of pieces of discrete data by storing the plurality of pieces of data into the destination data addresses sequentially.

3. The method of claim 1, further comprising:
obtaining the decoded processing instruction by decoding a received processing instruction, wherein the decoded processing instruction contains an operation code, and the operation code is configured to indicate a performing of a discrete storage processing.

4. A data processing apparatus, comprising:
an address determining unit configured to determine a source data address and a plurality of discrete destination data addresses of data corresponding to a processing instruction when a decoded processing instruction is a discrete store instruction, wherein the source data address comprises continuous data addresses; and
a data storage unit configured to obtain a plurality of pieces of discrete data by sequentially storing data read from the source data address to the plurality of destination data addresses,
wherein the address determining unit includes:
a source address determining subunit configured to determine source data addresses of a plurality of pieces of data according to source data base addresses and data sizes of the plurality of pieces of data in an operation field of the processing instruction, wherein each of the data sizes indicates a count of bits at each of the source data addresses, and
a destination address determining subunit configured to determine the plurality of destination data addresses respectively according to destination data base addresses and data offset addresses of the plurality of pieces of data in an operation field of the processing instruction.

5. The apparatus of claim 4, wherein the address determining unit includes:
a source address determining subunit configured to determine source data addresses of a plurality of pieces of data according to source data base addresses and data sizes of the plurality of pieces of data in an operation field of the processing instruction.

6. The apparatus of claim 4, wherein the address determining unit includes:
a destination address determining subunit configured to determine the plurality of destination data addresses respectively according to destination data base addresses and data offset addresses of the plurality of pieces of data in an operation field of the processing instruction.

7. The apparatus of claim 4, wherein the data storage unit includes:

a reading subunit configured to read data from source data addresses of a plurality of pieces of data respectively; and a storage subunit configured to obtain the plurality of pieces of data by storing the plurality of pieces of data into the destination data addresses sequentially.

8. The apparatus of claim 4, further comprising:

a decoding unit configured to obtain the decoded processing instruction by decoding a received processing instruction, wherein the decoded processing instruction contains an operation code, and the operation code is configured to indicate a performing of a discrete storage processing.

9. An electronic device comprising an artificial intelligence chip that includes a data processing apparatus, comprising:

an address determining unit configured to determine a source data address and a plurality of discrete destination data addresses of data corresponding to a processing instruction when a decoded processing instruction is a discrete store instruction, wherein the source data address comprises continuous data addresses; and a data storage unit configured to obtain a plurality of pieces of discrete data by sequentially storing data read from the source data address to the plurality of destination data addresses, wherein the address determining unit includes:

a source address determining subunit configured to determine source data addresses of a plurality of pieces of data according to source data base addresses and data sizes of the plurality of pieces of data in an operation field of the processing instruction, wherein each of the data sizes indicates a count of bits at each of the source data addresses, and a destination address determining subunit configured to determine the plurality of destination data addresses respectively according to destination data base addresses and data offset addresses of the plurality of pieces of data in an operation field of the processing instruction.

* * * * *